US006929266B2

(12) United States Patent
Peters et al.

(10) Patent No.: US 6,929,266 B2
(45) Date of Patent: Aug. 16, 2005

(54) BIT HOLDER

(75) Inventors: Michael P. Peters, Lutherville, MD (US); Jennifer R. Ervin, Annapolis, MD (US); Timothy B. Bailey, Tampa, FL (US)

(73) Assignee: Black & Decker Inc., Newark, DE (US)

( * ) Notice: Subject to any disclaimer, the term of this patent is extended or adjusted under 35 U.S.C. 154(b) by 37 days.

(21) Appl. No.: 10/457,736

(22) Filed: Jun. 9, 2003

(65) Prior Publication Data

US 2003/0230862 A1 Dec. 18, 2003

Related U.S. Application Data

(60) Provisional application No. 60/390,021, filed on Jun. 18, 2002.

(51) Int. Cl.[7] .............................................. B23B 31/107

(52) U.S. Cl. .......................................... 279/82; 279/155

(58) Field of Search ........................... 279/23.1, 29, 79, 279/80, 86, 155, 906, 74, 82

(56) References Cited

U.S. PATENT DOCUMENTS

| | | | | |
|---|---|---|---|---|
| 632,560 A | * 9/1899 | Furbish | ........................ | 279/82 |
| 1,209,572 A | * 12/1916 | Fegley | ........................ | 279/82 |
| 1,564,342 A | 12/1925 | Gebhardt et al. | | |
| 1,642,490 A | 9/1927 | Decker | | |
| 1,653,762 A | * 12/1927 | Fegley et al. | ................. | 279/82 |
| 2,809,845 A | 10/1957 | Emrick | | |
| 3,123,370 A | 3/1964 | Unander | | |
| 3,185,493 A | 5/1965 | Chadwick | | |
| 3,583,715 A | 6/1971 | Jahri | | |
| 3,767,218 A | 10/1973 | Linthicum et al. | | |
| 3,893,677 A | 7/1975 | Smith | | |
| 3,975,032 A | 8/1976 | Bent et al. | | |
| 4,146,240 A | 3/1979 | Nielsen | | |
| 4,202,557 A | 5/1980 | Haussmann et al. | | |
| 4,209,182 A | 6/1980 | Sheldon | | |
| 4,287,923 A | 9/1981 | Hornung | | |
| 4,573,839 A | 3/1986 | Finnegan | | |
| 4,577,875 A | * 3/1986 | Miyakawa | .................. | 279/75 |
| 4,626,146 A | 12/1986 | Neumaier | | |
| 4,629,375 A | 12/1986 | Lieser | | |
| 4,692,073 A | 9/1987 | Martindell | | |
| 4,701,083 A | 10/1987 | Deutschenbaur et al. | | |
| 4,786,221 A | 11/1988 | March | | |
| 4,858,939 A | 8/1989 | Riggs | | |
| 4,900,202 A | 2/1990 | Wienhold | | |
| 5,000,631 A | 3/1991 | Deutschenbaur et al. | | |
| 5,013,194 A | 5/1991 | Wienhold | | |
| 5,016,892 A | 5/1991 | Lafforgue et al. | | |
| 5,033,920 A | 7/1991 | Cantanese | | |
| 5,188,378 A | 2/1993 | Erlenkeuser | | |
| 5,219,174 A | 6/1993 | Zurbrugg et al. | | |
| 5,398,946 A | 3/1995 | Quiring | | |

(Continued)

FOREIGN PATENT DOCUMENTS

| | | |
|---|---|---|
| TW | 354003 | 1/1999 |

*Primary Examiner*—Daniel W. Howell
(74) *Attorney, Agent, or Firm*—Harness, Dickey & Pierce, P.L.C.

(57) ABSTRACT

A "snap-in" bit chuck assembly for a rotary hand or powered tool, includes a body having a hex shank at its rearward end and a retraction collar slidably disposed on the body. The body has a coaxial hex socket formed therein to allow a tool bit to be inserted thereinto. A coil spring biases the retraction collar forwardly and biases a retaining clip toward the bottom of an angular slot formed in the body. The bit is removed by sliding the retraction collar rearwardly, to compress the coil spring and allow the retaining clip to retract back up the slot. The bit is biased out of a locked position by a plunger that ensures that the bit remains disengaged when the retraction collar is released.

2 Claims, 2 Drawing Sheets

U.S. PATENT DOCUMENTS

| | | | | |
|---|---|---|---|---|
| D356,932 | S | 4/1995 | Owens et al. | |
| D359,432 | S | 6/1995 | Owens | |
| 5,447,397 | A | 9/1995 | Asano | |
| 5,464,229 | A | 11/1995 | Salpaka | |
| D366,052 | S | 1/1996 | Barton et al. | |
| 5,558,478 | A | 9/1996 | Odendahl et al. | |
| 5,709,391 | A | 1/1998 | Arakawa et al. | |
| 5,709,393 | A | 1/1998 | von Keudell et al. | |
| 5,755,448 | A | 5/1998 | Kanaan et al. | |
| 5,810,366 | A | 9/1998 | Montjoy et al. | |
| 5,820,136 | A | 10/1998 | Han et al. | |
| 5,947,484 | A | 9/1999 | Huggins et al. | |
| 5,954,347 | A | 9/1999 | Buck et al. | |
| D415,180 | S | 10/1999 | Rosanwo | |
| 5,971,403 | A | 10/1999 | Yahagi et al. | |
| 5,988,957 | A | 11/1999 | Wheeler | |
| 5,989,257 | A | 11/1999 | Tidwell et al. | |
| 6,000,940 | A | 12/1999 | Buss et al. | |
| D423,315 | S | 4/2000 | Robson | |
| 6,053,675 | A | 4/2000 | Holland et al. | |
| D426,840 | S | 6/2000 | Sakamaki | |
| D429,262 | S | 8/2000 | Streich | |
| 6,135,462 | A | 10/2000 | Robison | |
| 6,176,654 | B1 | 1/2001 | Jore | |
| 6,179,300 | B1 | 1/2001 | Baumann et al. | |
| 6,179,302 | B1 | 1/2001 | Gauthier et al. | |
| 6,193,242 | B1 | 2/2001 | Robison | |
| 6,199,872 | B1 | 3/2001 | Hasan | |
| 6,224,303 | B1 | 5/2001 | Wheeler et al. | |
| 6,261,035 | B1 | 7/2001 | Moores, Jr. et al. | |
| 6,270,085 | B1 | 8/2001 | Chen et al. | |
| D449,505 | S | 10/2001 | Glass et al. | |
| 6,302,408 | B1 | 10/2001 | Zierpka | |
| 6,311,989 | B1 | 11/2001 | Rosanwo | |
| 6,325,393 | B1 * | 12/2001 | Chen et al. | 279/22 |
| 6,343,901 | B2 | 2/2002 | Wheeler et al. | |
| 6,364,318 | B1 | 4/2002 | Bedi et al. | |
| 6,457,916 | B2 * | 10/2002 | Wienhold | 408/240 |
| 6,722,667 | B2 * | 4/2004 | Cantlon | 279/22 |

* cited by examiner

BIT HOLDER

CROSS-REFERENCE TO RELATED APPLICATIONS

This application claims the benefit of U.S. Provisional Application Ser. No. 60/390,021, filed on Jun. 18, 2002. The disclosure of the above application is incorporated herein by reference.

FIELD OF THE INVENTION

The invention relates generally to power or hand tool bit holders, variously known as "auxiliary chucks", "chucks", or "adapters", for removably receiving tool bits, such as fastener drivers, drill bits, or the like, for rotation therewith when the power tool is actuated or the hand tool is manually rotated. More particularly, the present invention relates to chuck assemblies or adapters configured for rapid and easy insertion and removal of a tool bit.

BACKGROUND AND SUMMARY OF THE INVENTION

Auxiliary chucks for power and hand tools have become increasingly common, especially as the need and desirability of wider versatility in the use of power tools and hand tools has increased. Such auxiliary chucks allow the hand or power tool to be used with any of a number of interchangeable bits. This, in turn, has resulted in demands for greater speed, convenience and ease of insertion and removal of tool bits from such chucks.

In one exemplary type of such conventional quick-release chucks, one or more detent balls are positioned within a hollow, barrel-shaped tool bit holder body and are resiliently biased into engagement with a circumferentially-extending groove or recess on the shank of the tool bit. Although this basic design has performed well, chuck assemblies or bit holders of this type have been found to be inordinately expensive and difficult to manufacture due to the relatively large number of parts required, as well as frequently requiring the operator to actuate a sleeve, collar or other component part during both the insertion and the removal of the tool bit.

Accordingly, the present invention seeks to provide a simple, relatively inexpensive quick-acting chuck assembly or bit holder that requires the operator to actuate its components only upon tool bit removal. A "snap-in" type of chuck assembly is provided for a drill, driver, or other rotary hand or powered tool, with the chuck assembly including a generally cylindrical body having a hex shank at its inner or rearward end for rotatable attachment to a drill or driver. A hollow cylindrically-stepped retraction collar or sleeve is slidably disposed for movement in an axial direction on a forward portion of the body, and the body has a coaxial hollow hex socket or bore formed therein which opens toward the outer or forward end of the chuck, in order to allow a tool bit to be inserted into the chuck assembly for rotation therewith.

An angular slot, extending in a radially-inward and axially-forward direction, is formed in the body, providing communication between the radially outer periphery of the body and the internal hollow hex bore. A coil spring surrounds the body and is disposed inside the retraction collar, with the inner or rearward end of the spring engaging a shoulder on the body and with the outer or forward end resiliently biasing the retraction collar forwardly and biasing a retaining clip radially inwardly and axially forwardly toward the bottom or inner end of the angular slot where it intersects with the body's hollow hex bore.

As a tool bit is snapped into the chuck's socket, this retaining clip, which is preferably of a generally U-shaped configuration, is forced to slide rearwardly and radially outwardly in the angular slot, against the bias of the coil spring, in order to allow the bit to be inserted. Once the bit is fully seated in the hex socket, the base portion of the U-shaped clip is resiliently urged back down toward the bottom of the angular slot where it engages the circumferential recess formed on the hex shank of the bit, thus retaining the bit in the hex socket or bore where it can be rotatably driven by the drill or driver to which the chuck assembly or bit holder is attached. The tool bit is removed from the chuck assembly by the operator sliding the retraction collar axially rearwardly along the body, thus compressing the coil spring to allow the retaining clip to retract back up the angular slot and release the tool bit so that the tool bit can be removed from the hex socket.

In preferred forms of the present invention, a plunger is mounted at the inner most end of the hex socket or bore. The plunger is spring biased to provide a force opposing the hex shank of the bit. The spring force is preferably selected so as to press the bit forward enough so that the circumferential recess in the hex shank is pressed forward so as to prevent re-engagement by the retaining clip when the retraction collar is pulled to a release position and subsequently released. However, the spring force is also selected to be weak enough so as not to eject the bit from the hex socket. Thus, an operator can hold the tool with one hand, pull the retraction collar to a release position with the other hand and then release the retraction collar and pull the tool bit out of the hex socket while maintaining control of the tool with the first hand.

Additional objects, advantages, and features of the present invention will become apparent from the following description and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

FIGS. 1 through 6 depict an exemplary preferred embodiment of a chuck assembly or tool bit holder according to the present invention, shown merely for purposes of illustration. One skilled in the art will readily recognize, from the following discussion and the accompanying drawings, that chuck assemblies or bit holders of configurations other than that of this exemplary illustration can also advantageously employ the principles of the present invention.

Figure 3:
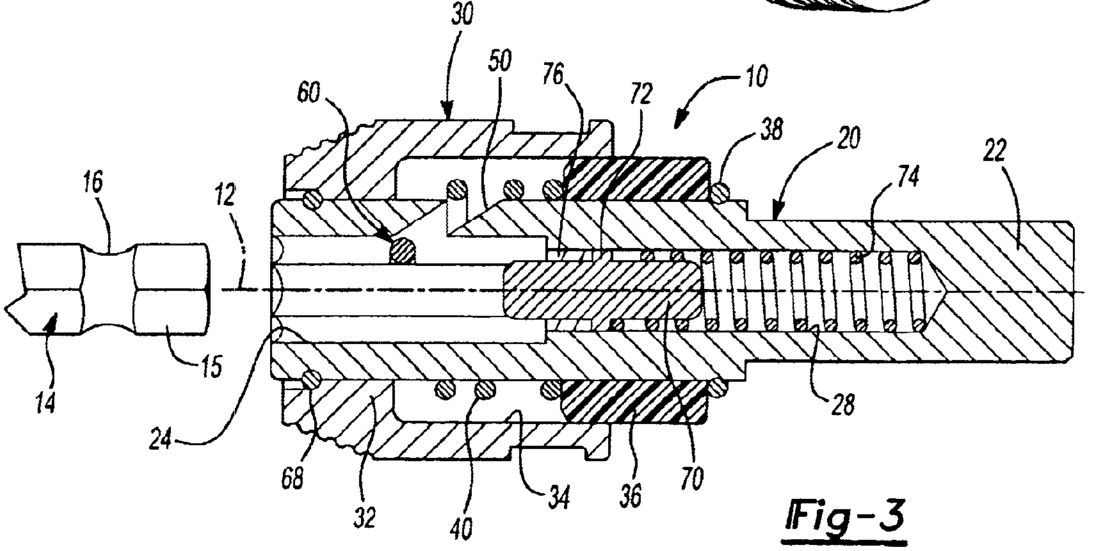
FIG. 3 is a longitudinal or axial cross-sectional view taken generally along line 3—3 of FIG. 1, illustrating a tool bit prior to insertion into the chuck assembly.

In FIGS. 1 through 6, an exemplary chuck assembly or bit holder 10 is attachable to a power tool or to a hand tool 18 to be driven for rotation about an axis 12 (shown in FIG. 3). The chuck assembly 10 is adapted to removably receive a tool bit 14 having a generally hex-shaped shank 15 with a circumferential recess 16 formed therein. The tool bit 14 can be any of a number of well-known bits, including drill bits, nut driver bits, screwdriver bits, or other types of fastener driver bits, for example.

Figure 6:
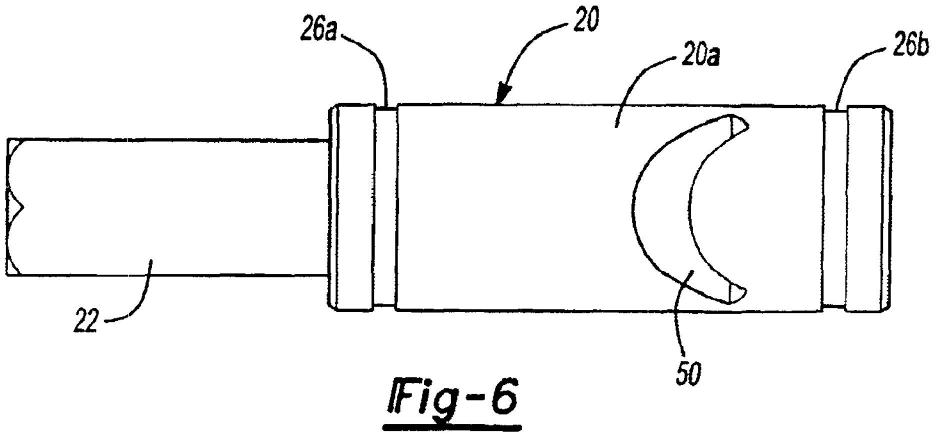
FIG. 6 is a side view of a body portion of the chuck assembly.

As best shown in FIGS. 3 and 6, the chuck assembly 10 generally includes a body 20, preferably having a hex shank 22 thereon for mounting the chuck assembly 10 for rotation by a hand tool or a power tool. A preferred hex-shaped socket or bore 24 is formed in the body 20, with the bore 24 opening axially outwardly toward the front or forward end of the chuck assembly 10. A pair of annular retainer grooves 26*a,* 26*b* are provided at opposite ends of a cylindrical main body portion 20*a* of the body 20 (as best shown in FIG. 6). A plunger bore 28 extends axially from the hex-shaped socket or bore 24 toward the rear end of the chuck assembly 10.

A generally cylindrical hollow retraction collar 30 surrounds a portion of the radially outer periphery of the body 20 and is axially slidable thereon. The hollow retraction collar or sleeve 30 includes a radially inwardly-directed forward flange 32 slidably surrounding a portion of the body 20, with a hollow internal bore 34 within the retraction collar 30 opening in an axially-rearward direction and being of a diameter sufficient to slidably surround an annular bearing sleeve 36 mounted on the rear end of the main body portion 20*a* of the body 20. The bearing sleeve 36 abuts against a retention ring 38 received in the rearward retainer groove 26*a* of the body 20.

The body 20 includes an angular slot 50 formed transversely therein, with the slot 50 extending from the radially outer surface of the body 20 in an axially forward and radially inward direction to communicate with the interior of the hex bore or socket 24. A generally U-shaped retaining clip 60 has a central base portion 62 and a pair of legs 64 at opposite ends of the central base 62 forming opposite corners 66 thereon. The base 62 of clip 60 is slidably disposed within the angular slot 50, and the two legs 64 extend around the body 20 to locations thereon that are on an opposite side of the axis 12 from the base 62 and the slot 50.

A coil spring 40 surrounds a portion of the body 20 and is disposed between the body 20 and the retraction collar 30. The coil spring 40 abuttingly engages the annular bearing sleeve 36 and directly engages the clip 60. Thus compressed, the coil spring 40 resiliently biases the clip 60 in forward axial and inward radial directions within the slot 50. Because of this direct abutting engagement with the clip 60 and its legs 64 (as discussed above), the resultant reactive axial force exerted by the clip 60 on the coil spring 40 is directed substantially along the axis 12, thus keeping the coil spring 40 coaxially aligned with the body 20.

Figure 4:
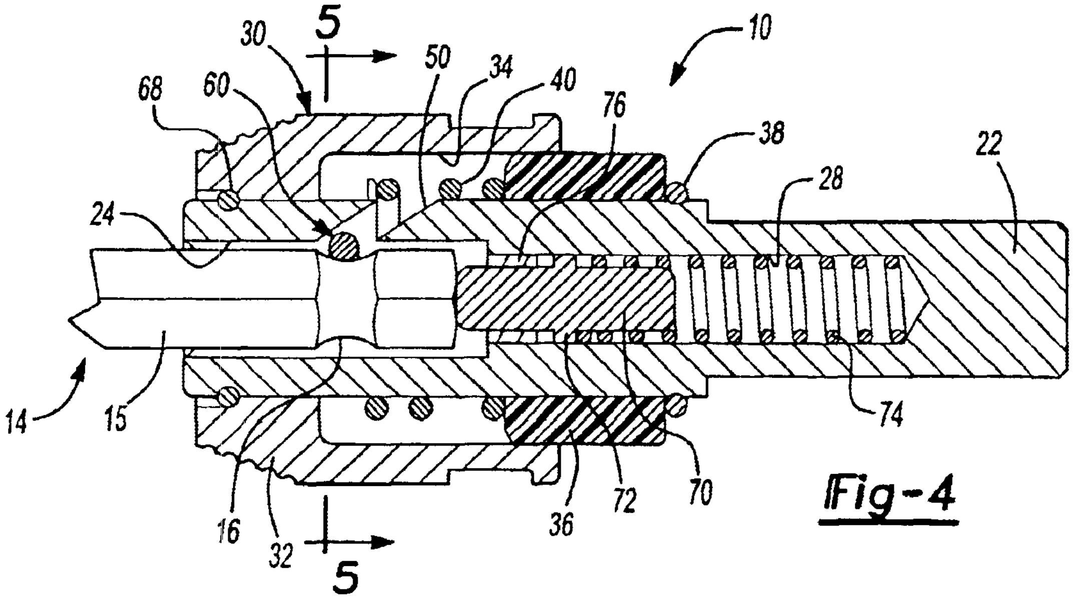
FIG. 4 is a longitudinal cross-sectional view similar to that of FIG. 3, but illustrating the tool bit fully inserted in the chuck assembly.
Figure 5:
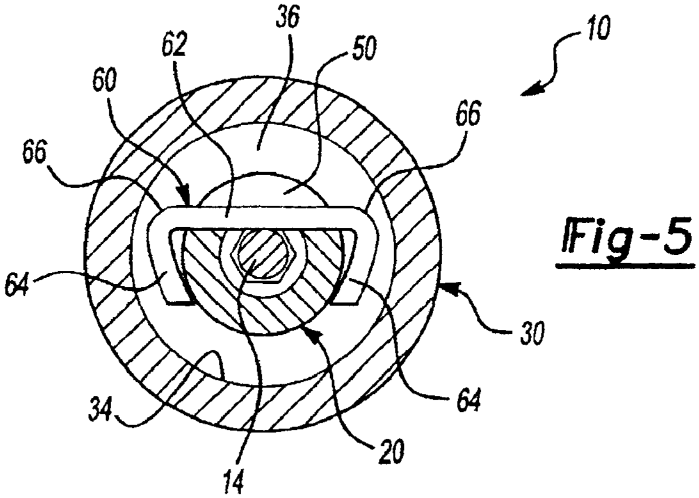
FIG. 5 is a lateral or radial cross-sectional view, taken generally along line 5—5 of FIG. 4.

As can best be seen in FIGS. 3 through 5, the clip 60 is retracted axially rearwardly and radially outwardly in the slot 50, during axially rearward retraction of the retraction collar 30. At the end of this retraction, the corners 66 (at the intersections of the legs 64 with the central base 62) move radially outwardly into contact with the internal surface of the internal hollow bore 34 of the retraction collar 30. This contact substantially prevents further axially rearward movement of the retraction collar 30, thus substantially minimizing the possibility of over-retraction and subsequent cocking or jamming of the retraction collar 30.

Still further, in accordance with the preferred form of the present invention, the coil spring 40 has at least one bight at each of its forward and rearward ends axially collapsed to form respective forward dead coil bights and rearward dead coil bights. This dead coil end bight arrangement can optionally be provided at either the forward or rearward ends of the coil spring 40, or preferably at both ends. Such dead coil bights at the ends of the coil spring 40 allow the coil spring 40 to engage the step 26 on the body 20 and the legs 64 of the clip 60, respectively, in a substantially flat abutting relationship therewith. This, in turn, serves to help maintain the coil spring 40 in a proper, coaxially-aligned relationship with the body 20 and helps eliminate the need for any of the prior art's intermediate sliding sleeves or other such intermediate members between the coil spring 40 and the clip 60. Thus, this arrangement helps eliminate the need for a flat portion on such an intermediate sleeve or member and a corresponding flat portion on the body 20 in order to keep such an intermediate sleeve or other such member properly aligned. This dead coil end bight arrangement, along with the other features of the chuck assembly 10 described above, all contribute to the increased simplification and decreased cost of machining and assembling the chuck assembly 10, as well as helping to minimize the number of required parts.

A retention ring 68 is preferably fixed in the forward retaining groove 26*b* at the forward end of the body 20 and thus serves to retain the above-described components in their assembled condition. The retention ring 68 is preferably in the form of a C-shaped clip ring.

A plunger 70 is received in the plunger bore 28 of the body 20. The plunger 28 is cylindrical or capsule shaped including an annular flange portion 72 extending radially outward from a center portion of the plunger 70. The annular flange portion 72 contacts the generally cylindrical inner wall surface of the plunger bore 28. A plunger spring 74 is received within the plunger bore 28 and abuts against a rearward wall thereof and against the annular flange 72 of the plunger 70. A plunger bearing 76 is provided to retain the plunger 70 within the plunger bore 28. The plunger bearing 76 has an annular ring shape which is received in the forward end of the plunger bore 28 and receives a forward end of the plunger 70 through an annular opening therein. The plunger bearing 76 can be press-fit or otherwise fastened within the end of the plunger bore 28. The flange 72 of the plunger 70 abuts against the plunger bearing 76 when there is no bit received within the chuck assembly 10, as best shown in FIG. 3.

As a bit 14 is inserted into the chuck assembly 10, as shown in FIG. 4, the end of the bit 14 presses against the forward end of the plunger 70 pressing the plunger rearward as illustrated in FIG. 4. The plunger is pressed against the spring force of the spring 74 into a retracted position. As the tool bit 14 is pressed inward, the retaining clip 60 is forced to slide rearwardly and radially outwardly in the angular slot 50, against the bias of the coil spring 40, in order to allow the bit to be inserted. Once the bit is fully seated in the hex socket 24, the base portion of the retaining clip 60 is resiliently urged back downward towards the bottom of the angular slot 50 where it engages the circumferential recess 16 formed on the hex shank 15 of the bit 14. The tool bit 14 is removed from the chuck assembly 10 by the operator sliding the retraction collar 30 axially rearwardly along the body 20 thus compressing the coil spring 40 to allow the retaining clip 60 to retract back up the angular slot 50 and release the tool bit 14 as the tool bit is pressed outward by the plunger 70. The spring force of the plunger spring 74 is preferably selected so as to press the bit forward enough with the centerline of the bit extending vertically so that the circumferential recess 16 in the hex shank 15 is pressed forward so as to prevent re-engagement by the retaining clip 60 when the retraction collar 30 is released by the operator. However, the spring force is also selected to be weak enough so as not to eject the bit from the hex socket. Specifically, the spring force is preferably weak enough to prevent ejection of the bit when the centerline of the bit is ten degrees below horizontal (−10 degrees from horizontal). Thus, an operator can hold the tool 18 with one hand, pull the retraction collar 30 to a released position with the other hand, and then release the retraction collar and pull the tool bit out of the hex socket 24 while maintaining control of the tool 18 with the first hand. The removal of the bit can be accomplished in this manner while the tool is positional such that the centerline of the bit is above −10 degrees from horizontal without the bit falling out.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims. For example, the U-shaped clip-type locking mechanism could be replaced with a ball-type locking mechanism as is well known in the art.

What is claimed is:

1. A tool bit holder for receiving a tool bit having a shank with a circumferential recess therein, comprising:

a body member having a cylindrical portion defining a longitudinal bore for receiving the tool bit therein, said body member further including a shank portion extending from said cylindrical portion, said cylindrical portion including an opening extending radially from said longitudinal bore and through an outer surface of said cylindrical portion;

a locking member associated with said opening in said cylindrical portion and adapted to reasonably engage a tool bit in said longitudinal bore;

a plunger disposed in said longitudinal bore, said longitudinal bore being free from any additional tool bit engaging components other than said locking member and said plunger; and a coil spring member having a first end disposed against an end of said longitudinal bore and a second end engaging said plunger, said plunger being engageable by a tool bit inserted in said longitudinal bore so as to cause said coil spring to compress, said coil spring having a spring force sufficient to press a tool bit forward to prevent re-engagement of the locking member with the circumferential recess in the tool shank when the locking member is released from engagement with the tool bit, said spring force being insufficient to eject the tool bit from the longitudinal bore with a centerline of the bit being disposed between 0 and −10 degrees from horizontal.

2. The tool bit holder of claim 1, wherein said locking member includes a U-shaped retaining clip.

* * * * *

UNITED STATES PATENT AND TRADEMARK OFFICE
CERTIFICATE OF CORRECTION

PATENT NO. : 6,929,266 B2 Page 1 of 1
DATED : August 16, 2005
INVENTOR(S) : Michael P. Peters et al.

Figure 1:
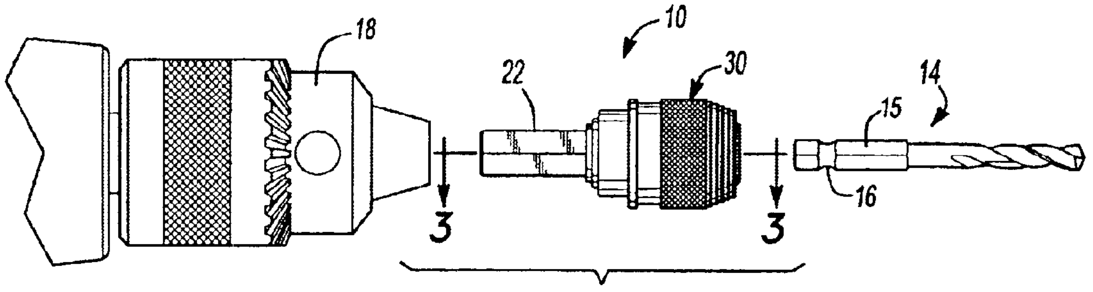
Figure 2:
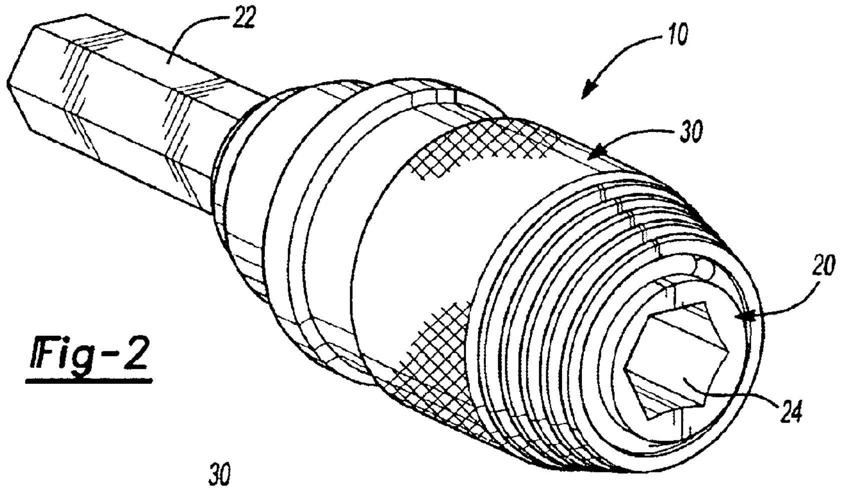
FIG. 2 is a perspective view of the chuck assembly according to the principles of the present invention.

It is certified that error appears in the above-identified patent and that said Letters Patent is hereby corrected as shown below:

Column 2,
Between lines 44 and 45, insert -- Figure 1 is a side view of a bit holder for a drill according to the principles of the present invention; --.

Signed and Sealed this

Twenty-third Day of May, 2006

JON W. DUDAS
*Director of the United States Patent and Trademark Office*